Dec. 5, 1961 J. Z. DE LOREAN 3,011,578
SIMULATED LOW PIVOT SWING AXLE SUSPENSION
Filed March 16, 1959 2 Sheets-Sheet 1

INVENTOR.
John Z. DeLorean
BY
W. F. Wagner
ATTORNEY

INVENTOR.
John Z. De Lorean
BY
W. H. Wagner
ATTORNEY

United States Patent Office 3,011,578
Patented Dec. 5, 1961

3,011,578
SIMULATED LOW PIVOT SWING AXLE SUSPENSION
John Z. De Lorean, Birmingham, Mich., assignor to General Motors Corporation, Detroit, Mich., a corporation of Delaware
Filed Mar. 16, 1959, Ser. No. 799,590
8 Claims. (Cl. 180—73)

This invention relates to vehicle suspension and more particularly to independent suspension for the driving wheels of a vehicle.

An object of the invention is to provide improved suspension for vehicle driving wheels.

Another object is to provide a swing axle type independent rear wheel suspension utilizing leaf spring elastic medium.

A further object is to provide a simulated low pivot swing axle suspension for vehicle driving wheels.

Still another object is to provide a swing axle suspension in which the elastic medium functions to establish the wheel deflection path.

A still further object is to provide a swing axle suspension in which a transverse leaf spring is associated with the sprung and unsprung mass of the vehicle in such a way as to provide both wheel control action and to serve as the elastic medium.

Yet a further object is to provide a suspension of the stated character in which the spring is located with respect to the sprung mass so that load deformation thereof causes the wheels to deflect about an effective axis substantially below the wheel rotation axis.

Yet another object is to provide a suspension of the stated character in which wheel stability is obtained entirely as a function of interaction of the leaf spring and the wheel driving axle.

These and other objects, advantages, and features of the invention will become more fully apparent as reference is had to the accompanying specification and drawing wherein.

Figure 1:
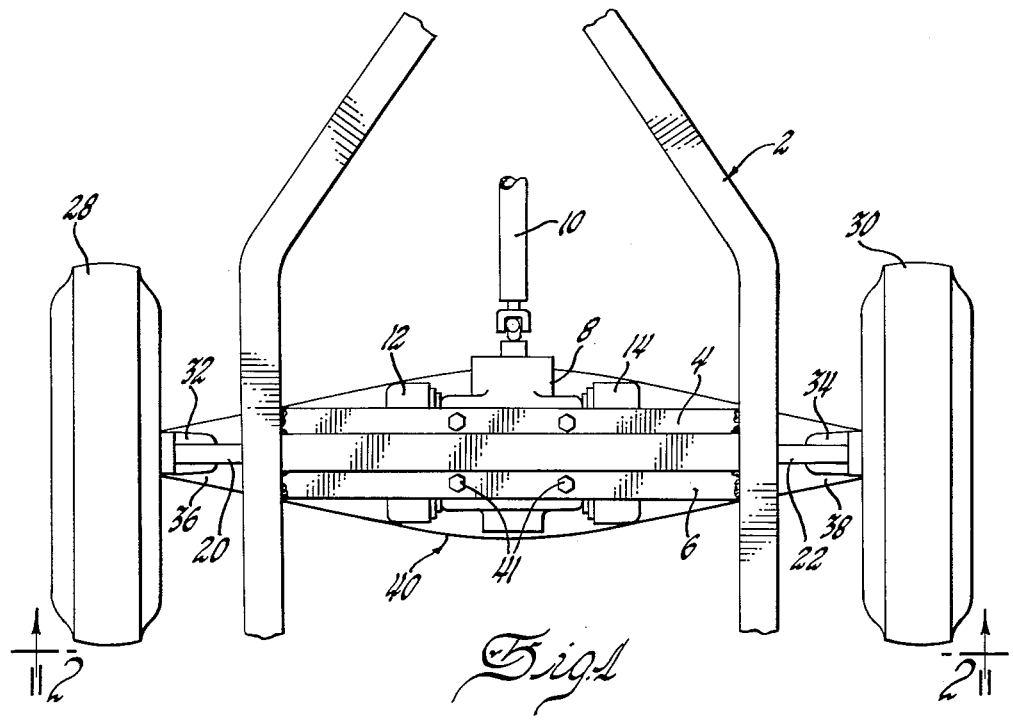
FIG. 1 is a fragmentary plan view of the rear end of a vehicle incorporating swing axle suspension according to the invention.
Figure 2:
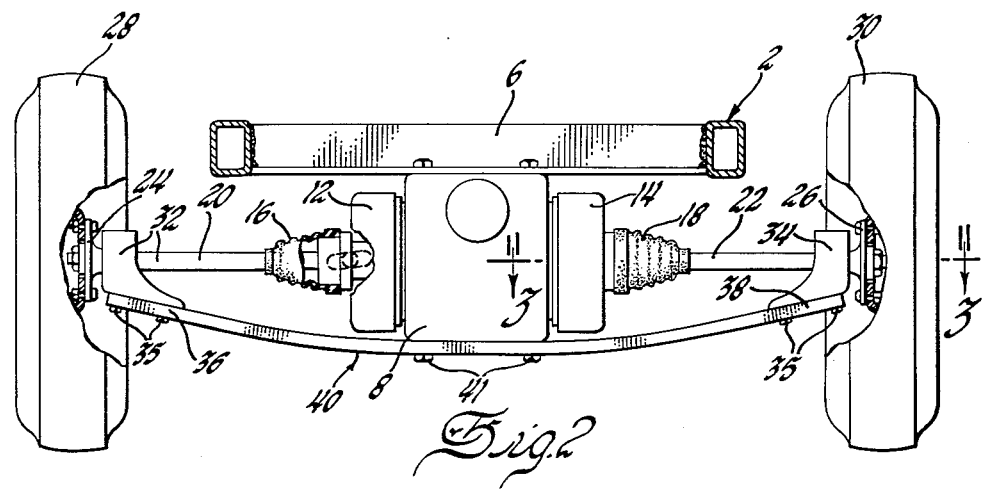
FIG. 2 is a view looking in the direction of arrows 2—2 of FIG. 1.

Referring now to the drawings and particularly FIGS. 1 and 2, there is illustrated a portion of a vehicle wherein the reference numeral 2 designates generally the frame portion of the vehicle sprung mass. Frame 2 includes a pair of longitudinally spaced cross frame members 4 and 6 which have suspended therefrom, resiliently or otherwise, a vehicle differential drive mechanism 8. Mechanism 8 is driven by a conventional engine driven propeller shaft 10 and at its lateral opposite sides is provided with inboard brake mechanisms 12 and 14. Outboard of each brake mechanism are "pot" type universal joint assemblies 16 and 18 to which are operatively connected live half axles 20 and 22. At their extreme outboard ends, half axles 20 and 22 have connected thereto detachable flange members 24 and 26 which are adapted for connection with driving wheels 28 and 30.

Slightly inboard of flanges 24 and 26, axles 20 and 22 extend through bearing support hubs 32 and 34 which are rigidly connected, as by bolts 35, to the lateral extremities 36 and 38 respectively of a transverse leaf spring 40. Centrally thereof, spring 40 is rigidly attached to the lower surface of differential mechanism 8, as by bolts 41. As seen best in FIG. 1, spring 40 is relatively wide in the region of the longitudinal midplane of the vehicle and progressively tapers toward its lateral extremities 36 and 38, so that each lateral portion of the spring functions as a cantilever spring having a common root at the base of differential 8.

Figure 3:
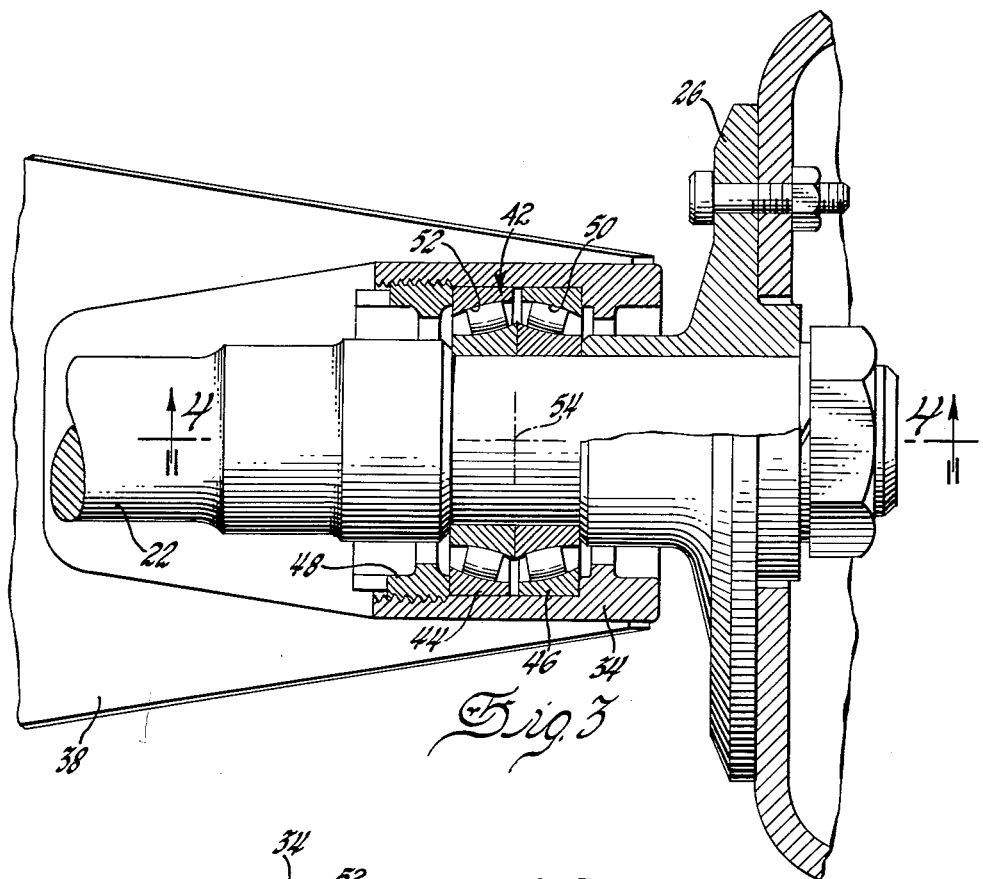
FIG. 3 is an enlarged fragmentary view looking in the direction of arrows 3—3 of FIG. 2.
Figure 4:
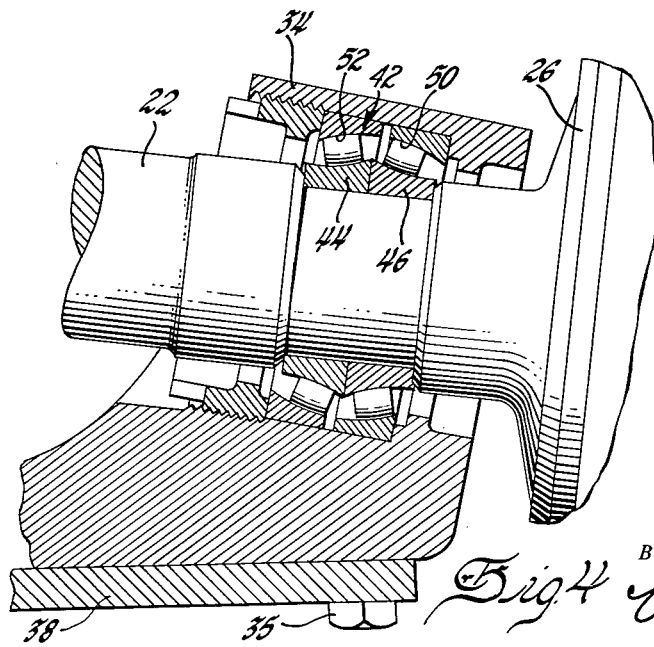
FIG. 4 is an enlarged fragmentary view looking in the direction of arrows 4—4 of FIG. 3 illustrating the change in angular relationship between the wheel driving axle and outer support therefor occurring incident to wheel deflection.

As seen best in FIGS. 3 and 4, hub portions 32 and 34 have retained therein spherical bearing assemblies 42 which provide both radial and thrust load support for axles 20 and 22, while permitting change in angular relationship between the hubs and respective axles incident to wheel deflection above and below the normal load position shown in FIG. 2. As will be noted in FIG. 3, the bearing assemblies include a pair of barrel-type roller bearing assemblies 44 and 46 which are arranged in back-to-back relationship and are secured in the associated hub by means of a threaded locking ring 48. The radius of curvature of outer races 50 and 52 of each bearing assembly are generated about a common point 54 which lies on the axis of rotation of each of the respective half axles. For a more complete description of the details of construction of the arrangement shown, reference may be had to my Patent No. 2,968,358, entitled "Swing Axle Suspension for Vehicle Driving Wheels," and assigned to General Motors Corporation.

In accordance with one feature of the present invention, the leaf spring 40 not only functions as the elastic medium supporting the sprung mass with respect to the unsprung mass, but also serves as the sole means of control of the wheel deflection path. As a result, the heretofore conventional hinged control arm employed in swing axle suspension is totally eliminated. According to another feature of the invention, the area of rigid attachment of the central root portion of the leaf spring is located at a vertical level substantially below the wheel rotation axis and, therefore, the flexible lateral portions simulate the effect of hinged wheel control arms in which the inboard axis is located below the wheel rotation axis. As in the case of hinged control arms, the low level disposition of the root portion of the leaf spring substantially reduces lateral tire scrub incident to vertical deflection of the wheels.

According to another feature of the invention, the root portion of leaf spring 40 is relatively wide in plan view in order to provide resistance to torsional deflection comparing favorably with wishbone type wheel control arms having inboard bushings which are relatively widespread fore and aft.

Inasmuch as vertical deflection of the wheels 28 and 30 from the position shown in FIG. 2 involves progressive change in the angular relationship between hubs 32 and 34 and the associated axles 20 and 22, spherical type thrust and radial bearings previously described are utilized to support the axles therein. Since the thrust bearings prevent axle displacement of the wheels with respect to the associated hubs, it will be apparent that wheel deflection will also induce telescoping of axles 20 and 22 with respect to differential 8. To accommodate such telescoping as well as angular deflection, universal joints 16 and 18 are of the axial sliding or "pot" type, preferably the type shown in United States Patent No. 2,898,750, John Z. De Lorean, entitled "Universal Joint," in which acceleration torque induces axial sliding of the axle relative to the pot in order to produce acceleration squat resistance.

From the foregoing it will be seen that an improved and simplified swing axle suspension has been provided. It will be noted that all of the desirable features of single universal joint low pivot swing axle suspension are retained with considerable reduction in cost and complexity of structure.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In a vehicle, the combination comprising a sprung mass, a drive mechanism supported on said sprung mass, a half axle operatively connected at one end to said drive mechanism, a wheel mounted on the other end of said half axle, at least one leaf spring extending transversely of said vehicle and rigidly connected at one end to said drive means at a vertical level substantially below the wheel rotation axis, and axle journal means rigidly mounted on the outer end of said leaf spring adjacent said wheel, said axle journal means being the sole connection between said axle and leaf spring.

2. In a vehicle, the combination comprising a sprung mass, a differential drive mechanism mounted on said sprung mass, a pair of half axles, universal joint means operatively connecting the inboard ends of said axles to said drive mechanism, a wheel mounted on the outer end of each half axle, at least one leaf spring extending transversely of said vehicle and rigidly connected to said drive mechanism at a vertical level substantially below the wheel axes, and axle journal means rigidly mounted on the outer ends of said leaf spring adjacent each of said wheels, said axle journal means being the sole connection between said axles and leaf spring.

3. In a vehicle including a frame mounted axle driving mechanism, a simulated low pivot swing axle suspension comprising oppositely extending live axles operatively connected at their inboard ends to said drive mechanism, a pair of wheels rigidly connected respectively to the outer end of each axle, at least one leaf spring extending between said wheels and rigidly connected at its midportion to said drive mechanism at a vertical level substantially below the normal axis of rotation of said wheels, and a pair of axle journaling hubs rigidly connected respectively to the outer ends of said leaf spring, said hubs being the sole connection between said axles and said leaf spring.

4. In a vehicle including a frame mounted axle driving mechanism, a simulated low pivot swing axle suspension comprising oppositely extending swingable live axles operatively connected at their inboard ends to said drive mechanism, a pair of wheels rigidly connected respectively to the outer end of each axle, a single leaf spring extending between said wheels and rigidly connected transversely midway thereof to said drive mechanism at a vertical level substantially below the normal axis of rotation of said wheels, and a pair of axle journaling hubs rigidly connected respectively to the outer ends of said spring.

5. The structure set forth in claim 4 wherein said leaf spring in plan view is relatively broad at its midportion and progressively tapers toward its opposite ends.

6. In a vehicle including a frame mounted differential, a simulated low pivot swing axle suspension comprising oppositely extending swingable live axles operatively connected at their inboard ends to said drive mechanism, a pair of wheels rigidly connected respectively to the outer end of each axle, a single leaf spring extending between said wheels and rigidly connected transversely midway thereof to said differential at a vertical level substantially below the normal axis of rotation of said wheels, a pair of axle journaling hubs rigidly connected respectively to the outer ends of said spring, and bearing means interposed between said axles and the respective hubs providing radial bearing support for said axle while permitting limited angular deflection of the latter with respect to said hubs.

7. The structure set forth in claim 6 wherein said bearing means includes thrust bearing means engaging said axles to prevent axial displacement of the latter with respect to said hubs throughout the normal range of deflection of said wheels.

8. The structure set forth in claim 6 wherein the operative connection between the inboard ends of said live axles and said drive mechanism comprises universal joint mechanism including sliding coupling means permitting relative axial movement between said axles and said differential.

References Cited in the file of this patent

UNITED STATES PATENTS

| | | |
|---|---|---|
| 1,866,656 | Ledwinka | July 12, 1932 |
| 2,145,670 | Tjaarda | Jan. 31, 1939 |
| 2,194,395 | Klavik | Mar. 19, 1940 |
| 2,757,747 | MacPherson | Aug. 7, 1956 |
| 2,784,794 | Barenyi | Mar. 12, 1957 |
| 2,857,975 | Thorne | Oct. 28, 1958 |

FOREIGN PATENTS

| | | |
|---|---|---|
| 291,669 | Italy | Dec. 22, 1931 |